United States Patent
MacArthur

(10) Patent No.: US 6,655,880 B2
(45) Date of Patent: Dec. 2, 2003

(54) END MILL

(76) Inventor: Mike MacArthur, 3300 Nicolaus Rd., Lincoln, CA (US) 95648

( * ) Notice: Subject to any disclaimer, the term of this patent is extended or adjusted under 35 U.S.C. 154(b) by 79 days.

(21) Appl. No.: 09/784,932

(22) Filed: Feb. 15, 2001

(65) Prior Publication Data

US 2002/0141833 A1 Oct. 3, 2002

(51) Int. Cl.$^7$ ................................. B23C 5/10
(52) U.S. Cl. ............................... 407/53; 407/61
(58) Field of Search ................. 407/54, 118, 119, 407/63, 30, 34, 53, 61, 56; 408/230, 53, 56–63

(56) References Cited

U.S. PATENT DOCUMENTS

| | | | |
|---|---|---|---|
| 2,966,081 A | * 12/1960 | Kallio | 408/230 |
| 2,996,081 A | * 8/1961 | Kallio | 77/70 |
| 3,409,965 A | * 11/1968 | Fisher | 407/54 |
| 3,874,900 A | 4/1975 | Post et al. | |
| 3,913,196 A | * 10/1975 | Maday | 144/219 |
| 3,988,955 A | 11/1976 | Engel et al. | |
| 4,227,837 A | * 10/1980 | Yodoshi | 407/53 |
| 4,395,167 A | * 7/1983 | Maternus | 407/54 |
| 4,470,895 A | 9/1984 | Coad et al. | |
| 4,475,850 A | * 10/1984 | Penoza et al. | 407/53 |
| 4,480,949 A | * 11/1984 | Van De Bogart | 407/54 |
| 4,610,581 A | * 9/1986 | Heinlein | 144/240 |
| 4,945,640 A | 8/1990 | Garg et al. | |
| 4,963,059 A | * 10/1990 | Hiyama | 407/11 |
| 5,221,163 A | * 6/1993 | Nishimura | 407/53 |
| 5,467,670 A | 11/1995 | Alverio | |
| 5,477,616 A | 12/1995 | Williams et al. | |
| 5,486,072 A | * 1/1996 | Green | 407/32 |
| 5,575,704 A | 11/1996 | Hotani | |
| 5,590,987 A | * 1/1997 | Bouzounie | 408/230 |
| 5,685,671 A | * 11/1997 | Packer et al. | 404/118 |
| 5,709,587 A | 1/1998 | Shaffer | |
| 6,007,276 A | * 12/1999 | Wardell | 407/54 |
| 6,105,467 A | 8/2000 | Baker | |
| 6,443,674 B1 | * 9/2002 | Jaconi | 408/1 R |

FOREIGN PATENT DOCUMENTS

| | | |
|---|---|---|
| JP | 42029 | 4/1976 |
| JP | 42030 | 4/1976 |
| JP | 120937 | 9/1980 |
| JP | 131173 | 10/1980 |
| JP | 144937 | 11/1980 |
| JP | 3152 | 1/1981 |

* cited by examiner

Primary Examiner—Daniel W. Howell
(74) Attorney, Agent, or Firm—James M. Ritchey

(57) ABSTRACT

An improved end mill and method of producing are presented wherein the end mill has a neck with a neck diameter, a cutting end with a cutting end diameter, a flute formed within the cutting end, and a cutting edge formed along an outer border of the flute an the improvement includes a highly or mirorr polished cutting edge land extending from and along the cutting edge. Additionally, included are a primary angle land continuing from the mirror polished cutting edge land and extending into the flute, a secondary angle land adjoining the primary angle land and terminating within the flute, and, if desired, a smoothed transition region between the cutting end diameter and the neck diameter.

6 Claims, 5 Drawing Sheets

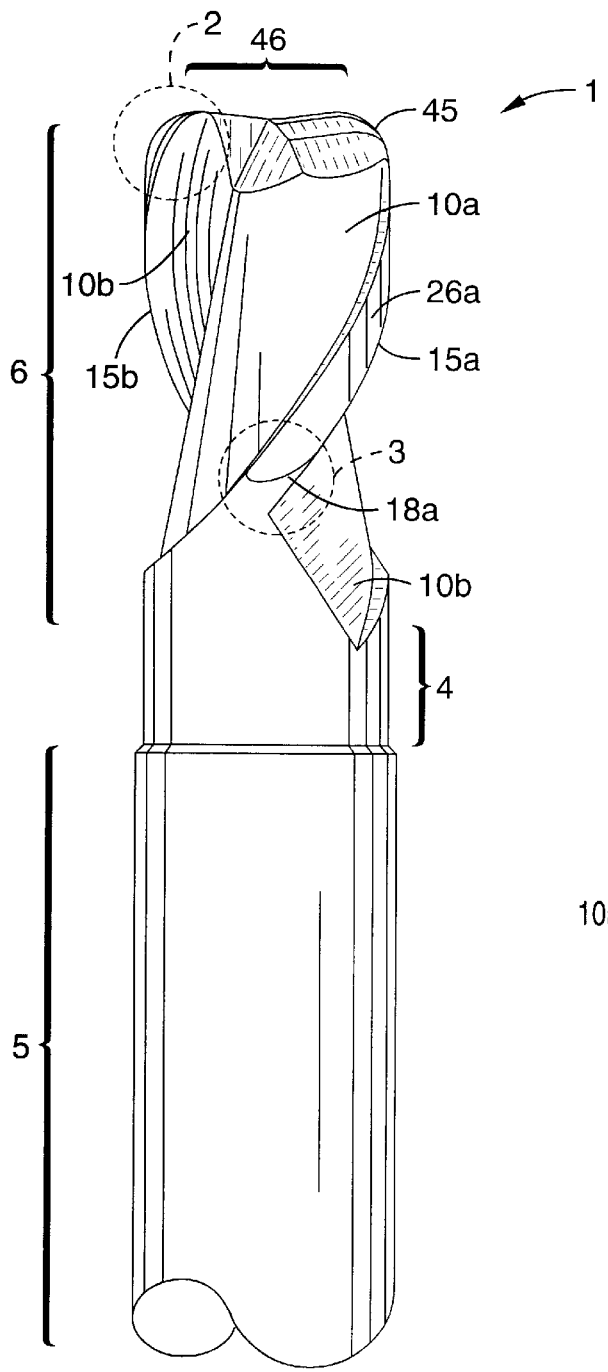
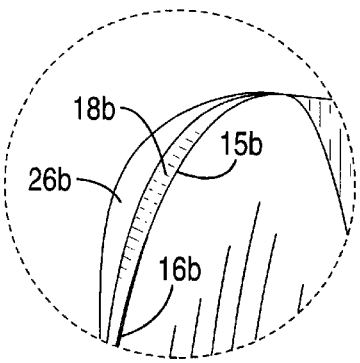
FIG. 2
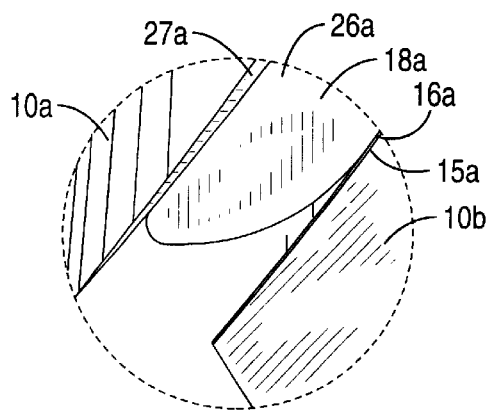
FIG. 3
FIG. 1

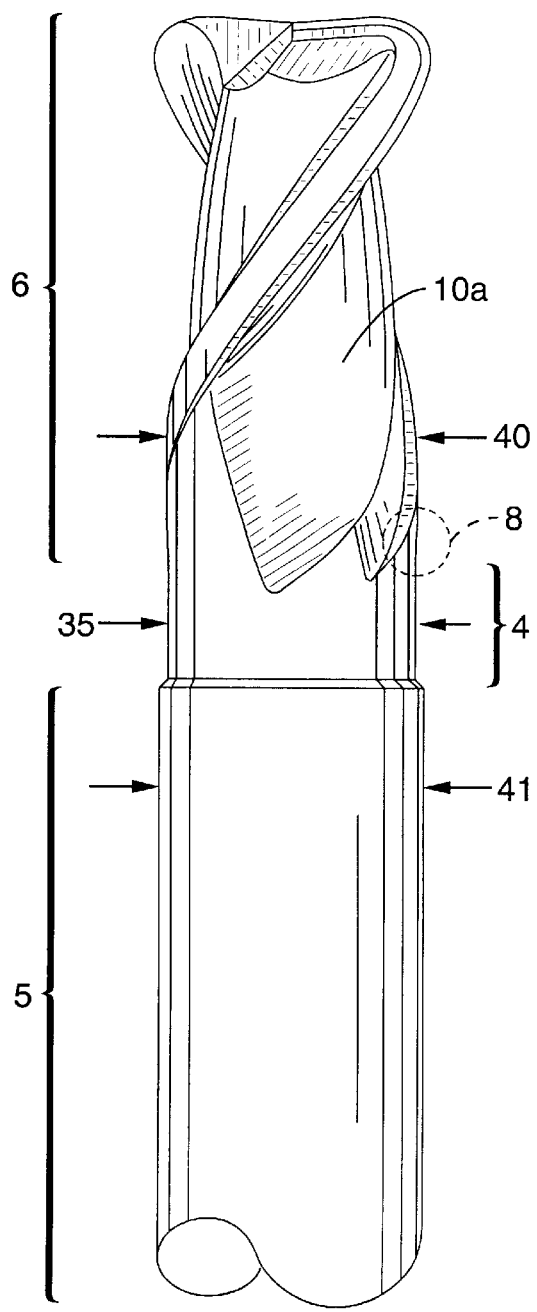
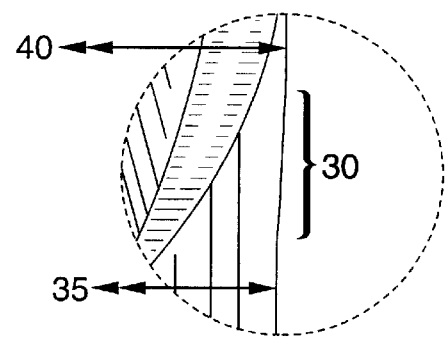
FIG. 7
FIG. 8

END MILL

BACKGROUND OF THE INVENTION

1. Field of the Invention

An improved cutting edge on an end mill, method of production, and method of use are provided. In particular, the subject invention discloses an improved end mill having a highly or mirror polished chatter-dampening cutting edge land and a smoothed cutting edge to shank neck transition region and a procedure for producing same, wherein the improved cutting edge dampens vibrations during part machining and the smoothed transition region minimizes sharp corners on the machined part that roughen the part's finished surface.

2. Description of the Background Art

Rotational end mills have been utilized for various cutting duties over many years. Numerous sharpening methods have been developed in the past. When a traditionally sharpened end mill, frequently composed of carbide and carbide alloys, rotationally encounters a substance like aluminum or the like, the mill begins to "chatter," whereby the rotating end mill's frequency of vibration self-excites and causes a poor finish on the machined part. The self-exciting chatter is usually accompanied by a loud noise while machining. The self-exciting chatter has been an inherent characteristic of long diameter to length cutting tools. In addition to the poor finish associated with the traditional chatter-producing end mill is a limitation with thin-walled aluminum parts. The end mill chatter may stress the thin-walled aluminum parts beyond structural limits and produce unacceptable parts. Further, chattering can dull the cutting edge of an end mill and limit its useful life, thereby increasing costs for the milling operation and generating less precise machined parts than may be desired or required for a particular final function.

Specifically, U.S. Pat. No. 5,467,670 discloses a chemical vapor deposition (CVD) process for attempting to keep the edges of rotary cutting tools sharp. The high temperatures in this process cause a chemical reaction to occur on the surface of the cutting tool. Generally, the process involves final grinding on all surfaces except the flank faces. All of the surfaces of the tool are then wear coated with a CVD process at a high enough temperature to embrittle the sharp, rough ground cutting edges. The flank faces are then ground to specification sharpness, thereby removing the embrittled layer on the flank faces while leaving the rake faces CVD coated. If desired, a final PVD wear layer coating may then be applied.

Disclosed in U.S. Pat. No. 4,945,640 is a wear resistant coating for sharp-edged tools and the like. Usually, a base layer of noble metal is formed on the surface followed by an intermediate layer of tungsten and a final coating of a mixture of tungsten and tungsten carbide.

U.S. Pat. Nos. 3,874,900 and 3,988,955 both relate methods for coating wear surfaces with vapor deposits.

U.S. Pat. No. 4,470,895 presents an ion plating method for depositing a coating. The method stop the application of the coating immediately next to where the cutting edge begins so as to leave the cutting edge not covered.

In U.S. Pat. No. 5,477,616 the body of a knife blades is coated with a hard material in such a manner as to permit the entire cutting edge to be formed from the harder material.

Six patent from Japan (Nos. 51-42,029; 51-42030; 55-120937; 55-131173; 55-144937; and 56-3152) illustrate the use of various compositions of hardening material on the surfaces of cutting implements.

U.S. Pat. No. 6,105,467, by the subject inventor, discloses a method of increasing the length of time a tool maintains sharp cutting edges. The method utilizes the steps of manufacturing the tool with the cutting edges ground sharp and then partially dulling, to a lighter or heavier extent, those previously ground sharp cutting edges. Often the partial dulling is accomplished by means of applying a brush wheel to the selected cutting edges.

The foregoing patents reflect the state of the art of which the applicant is aware and are tendered with the view toward discharging applicant's acknowledged duty of candor in disclosing information which may be pertinent in the examination of this application. It is respectfully submitted, however, that none of these patents teach or render obvious, singly or when considered in combination, applicant's claimed invention.

SUMMARY OF THE INVENTION

An object of the present invention is to provide an improved end mill that reduces chatter during usage, thereby producing better finishes on milled parts.

Another object of the present invention is to furnish an improved end mill having a feathered blend that smoothes a cutting diameter to a neck/shank diameter that helps to eliminate steps and mismatching of side walls when multiple axial depths are required to finish a side wall in a milled part.

A further object of the present invention is to supply an improved end mill that has a mirror polished cutting land which minimizes chattering during milling of a part.

Still another object of the present invention is to disclose a method of producing an improved end mill in which the produced end mill has a mirror polished cutting land and a feather blend that smoothes a cutting diameter to a neck/shank diameter.

Disclosed is an improved end mill having a neck/shank with a neck/shank diameter, a cutting end with a cutting end diameter, a flute formed within the cutting end, and a cutting edge formed along an outer border of the flute, with the improvement comprising a highly or mirror polished cutting edge land extending from the cutting edge, a primary angle land continuing from the mirror polished cutting edge land and extending into the flute, a secondary angle land adjoining the primary angle land and terminating within the flute, and a smoothed transition region between the cutting end diameter and the neck diameter.

Additionally a method for producing the improved end mill is disclosed. The method to make the improved end mill includes the steps of producing a ground cylindrical member with a smoothed surface, wherein the ground cylindrical member includes a chamfered shank and a potential cutting end of appropriate diameter and length, polishing the potential cutting end of the ground cylindrical member to a mirror finish with a polishing wheel and polishing compound, grinding and polishing at least one flute (usually two) into the potential cutting end of the mirror finished cutting end, wherein a cutting edge is produced and a mirror polished cutting edge land that extends from said cutting edge to said flute, grinding primary and secondary angle lands within the flute, wherein the primary angle land continues from the mirror polished cutting edge land and extends into the flute and the secondary angle land is adjoining the primary angle land and terminating within the flute, and producing a smoothed transition region between the cutting end diameter and the neck diameter by means of a partially angled grinding wheel.

Other objects, advantages, and novel features of the present invention will become apparent from the detailed description that follows, when considered in conjunction with the associated drawings.

BRIEF DESCRIPTION OF THE DRAWINGS

FIG. 1 shows a side view of the subject end mill cutting device.

FIG. 2 is an enlarged view of the portion of FIG. 1 denoted as "2" and shows a cutting edge, cutting land, and primary land of the subject invention.

FIG. 3 is an enlarged view of the portion of FIG. 1 denoted as "3" and shows another cutting edge, cutting land, and primary land of the subject invention and includes a secondary land.

FIG. 7 is a side view and shows the "feather blend" transition region between the cutting diameter and the neck/shank diameter of the subject invention.

FIG. 8 is an enlarged view of the portion of FIG. 7 denoted as "8" and stresses the "feather blend" transition region between the cutting diameter and the neck diameter of the subject invention.

DESCRIPTION OF THE PREFERRED EMBODIMENT

Figure 4:
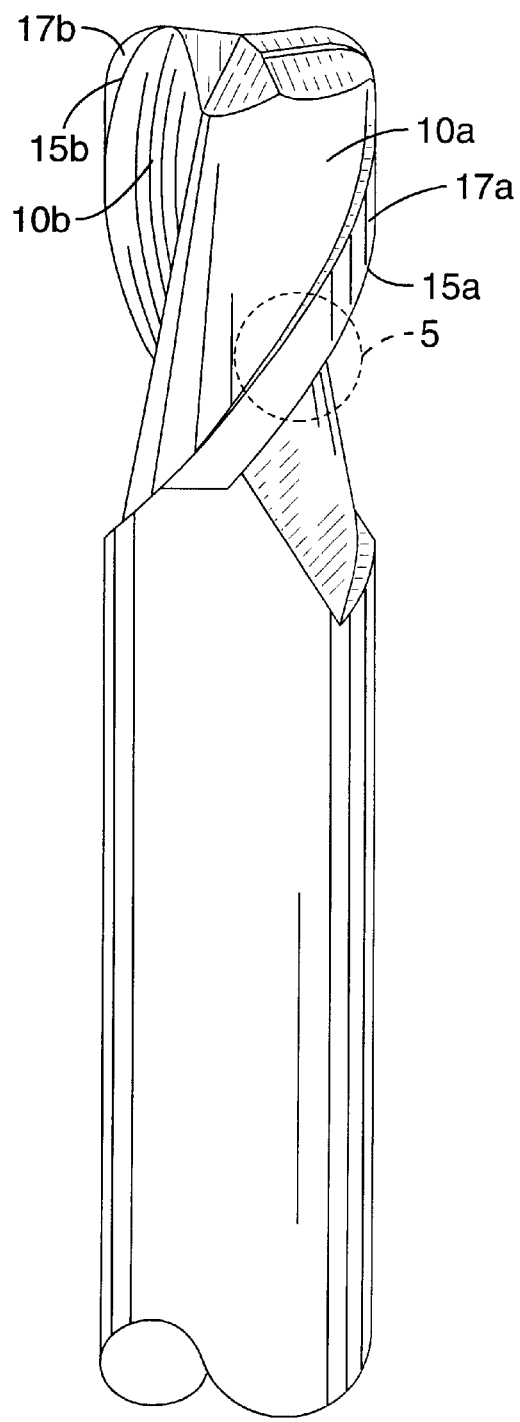
FIG. 4 shows a side view of the subject end mill cutting device during the manufacturing process, wherein the subject "initial" or wide mirror edge cutting lands and flutes have been formed in the tool, but the primary and secondary lands and "final" or narrow mirror edge cutting land have not yet been formed.

A preferred embodiment of the improved cutting edge on a tool comprises a highly or mirror polished cutting edge and a "feathered" or smoothed cutting edge to shank transition region. Preferably, the tool is a rotational end mill, or the equivalent, having cutting edges. Usually, at least both axial and radial cutting edges exist on end mills. Many end mills are fabricated from various commercial grades of solid carbide and carbide alloy and are designed to machine parts fabricated from softer aluminum to harder stainless steels and related alloys. The subject invention is particularly useful in machining aluminum parts where deep pockets and thin walls are encountered.

FIG. 1 shows a side view of the subject invention end mill 1 having a neck 4 (having a neck diameter, see below),shank 5 (having a diameter either larger or smaller than the neck diameter 35, cutting end 6 (having a cutting diameter 40 larger than the neck diameter 35 (for clearance), see below), and two opposing flutes 10A and 10B that spiral down from the cutting tip to the neck 4, thereby creating the cutting end 6 (with a "feather blend" region 30 between the cutting end 6 and neck 4, see below). Each end mill 1 is formed from a suitably sized cylinder of metal. Usually, the metal of choice from which to form an end mill 1 is tungston carbide or its equivalent. Although this exemplary end mill 1 has only two flutes 10A and 10B, end mills with one, three, four, or more flutes are contemplated to be within the realm and this disclosure and would serve just as satisfactorily with the subject method as the two flute version depicted in FIG. 1. Following along each flute's 10A and 10B outer boundary are spiraling cutting edges 15A and 15B, respectively, with each cutting edge including a narrow (almost invisible to the naked eye) highly or mirror polished surface/land 16A and 16B, just behind the actual cutting edges 15A and 15B. As seen in FIGS. 1, 2, and 3, the cutting edge lands 16A and 16B merge into a step 27A or 27B in the appropriate flute 10A or 10B through primary relief angle lands 18A or 18B, and secondary relief angle lands 26A or 26B Again, each of the primary relief angle lands 18A and 18B extend from the matching cutting edge land 16A and 16B, respectively to the secondary relief angle lands 26A and 26B. The subject end mill fabrication process (see below for details) generates a highly or mirror polished surface for each of the cutting edge lands 16A and 16B that is, during milling of a part, chatter self-dampening.

More particularly, the subject improved end mill's cutting edges 15A and 15B utilize a special geometry that causes process damping of aluminum part materials. The mirror polished cutting edge lands 16A and 16B on each cutting edge 15A and 15B, respectively, causes the part frequency to match the natural frequency of the improved tool. This matching of frequencies allows more material to be removed without increasing chatter. As indicated above, chatter is a self excited frequency response that causes poor finish and loud noise while machining a part. The geometry of the improved end mill 1 is used on tools with long diameter to length ratios. The farther a tool sticks out of a machining spindle, during the machining of a part, the more inherently flexible it is, thus more susceptible to chatter. The subject mirror polished cutting edges lands 16A and 16B help to eliminate the inherent chatter problem of the long diameter to length ratios. Also, the mirror polished cutting edges lands 16A and 16B of the subject improved end mill reduce chatter in machining thin-wall aluminum parts that have their own associated resonance problems.

The subject cutting edges 15A and 15B have mirror polished lands 16A and 16B, respectively, next to the primary relief angle lands 18A and 18B. These subject mirror polished cutting edge lands 16A and 16B are not ground as one would a traditional form a land; rather they (16A and 16B) are highly or mirror polished before the flutes 10A and 10B are produced in the shank 5 and then left mirror polished and are left cylindrical in the final mill tool.

Figure 6:
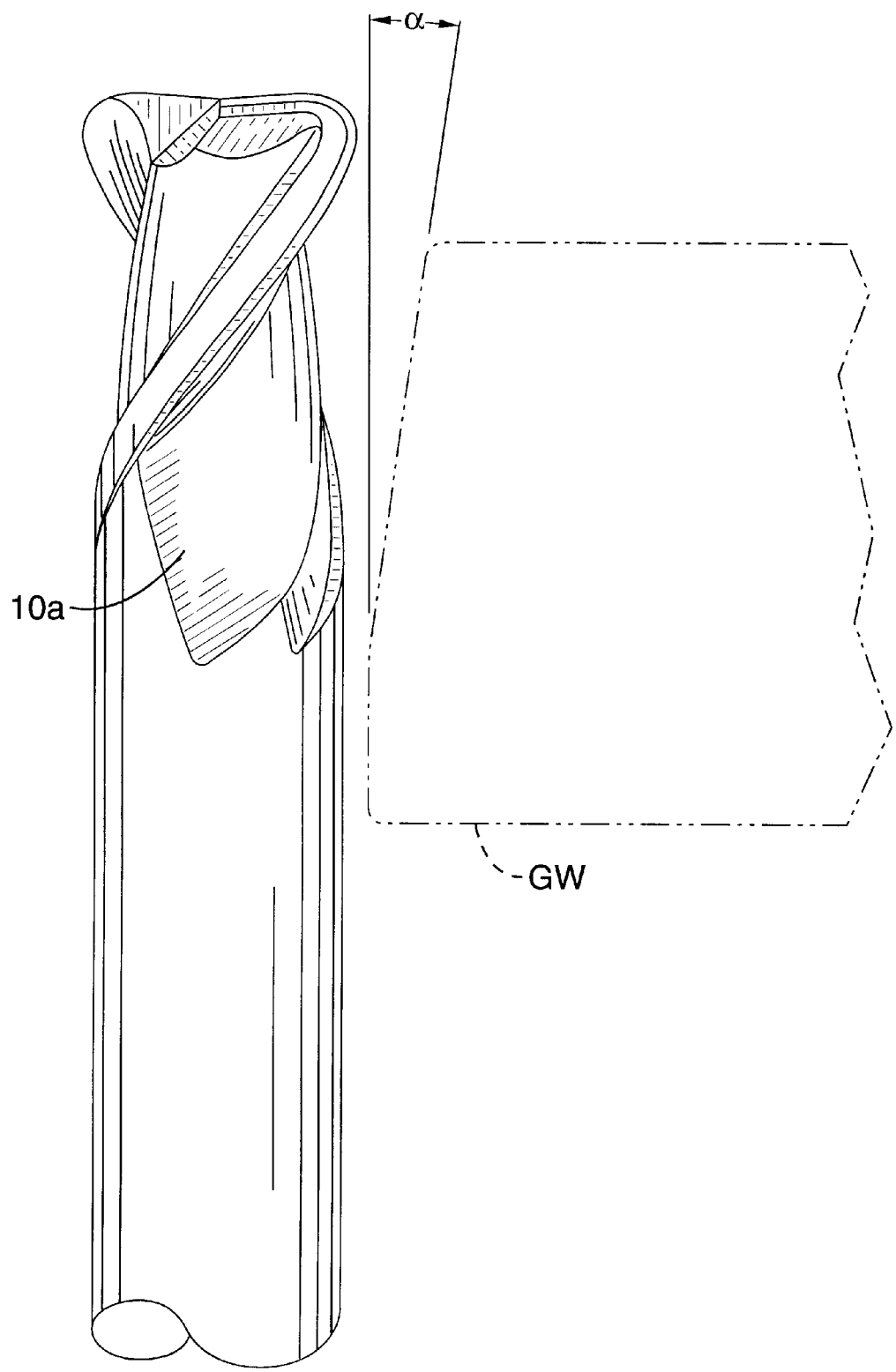
FIG. 6 shows a side view of a nearly finished subject end mill cutting device and a grinding wheel that will "feather blend" the cutting diameter to the neck diameter.
Figure 9:
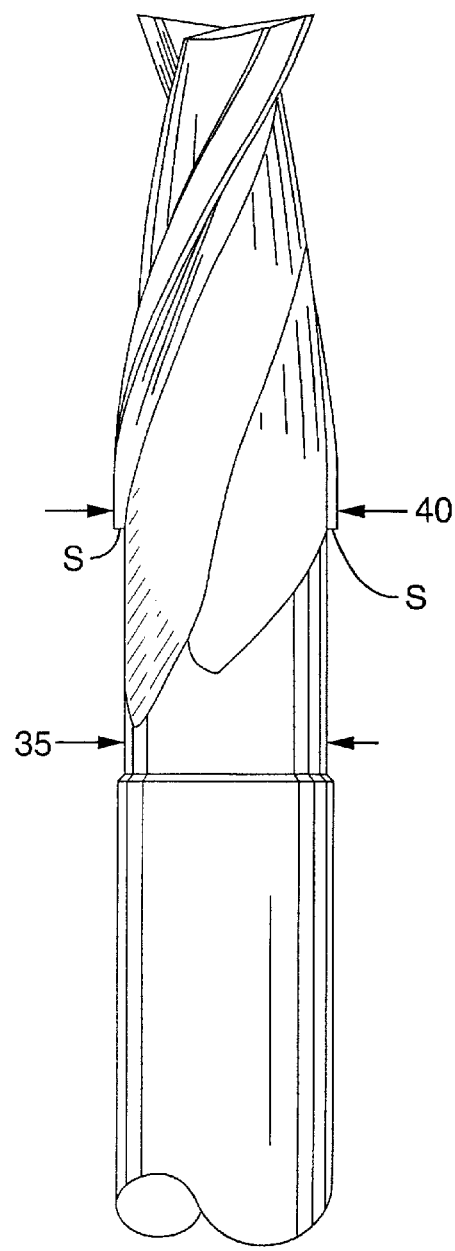
FIG. 9 is a PRIOR ART figure shown cutting diameter to neck/shank diameter abrupt "step" or "ledge" found in traditional mills, unlike the subject "feather blend" transition.

In addition to the mirror polished cutting edge lands 16A and 16B, the subject improved end mill 1 comprises (if a neck 4 is present on the tool) a "feather blended" angle region 30 that transitions from the neck diameter 35 to the cutting diameter 40 of the end mill 1 (see FIGS. 6, 7, and 8 for details and it must be noted that in the figures the neck diameter 35 is smaller than the cutting 40. The subject transition angle region 30 helps to eliminate steps and mismatching of side walls when multiple axial depths are required. The subject transition angle region 30 is very helpful for insuring structural integrity and eliminating sharp corners on machined parts. The "feather blend" of the transition angle region 30 is accomplished by utilizing a tapered grinding wheel when necking the tool (see below for details). The tapered grinding wheel produces a smooth transition between the cutting diameter 40 and the neck diameter 35 of the tool. An example of the existing and standard "step" transition S is shown in FIG. 9 in which a sharp transition is seen between the neck diameter 35 and the cutting diameter 40 of the traditional end mill. It is noted that the mirror land cutting portion of the subject invention may be utilized without the feather blend smoothing, if desired.

The manufacturing process for the subject cutting tool or end mill 1 comprises several steps that will now be described:

Steps in Manufacturing the Cutting Tool

1. Take a blank piece of suitably shaped carbide and cut off by standard means to an appropriate length to generate the initial form of the tool.

2. Chamfer the shank 5 of the tool.

3. Cylindrically grind the shank of the tool (the final cutting diameter 40 is larger than the neck diameter 35 (for clearance reasons during milling of a part) and the shank diameter 41 can be larger or smaller than the neck diameter 35 ) or centerless grind the entire tool.

4. Cylindrically grind the cutting end 6 of the tool to the appropriate diameter 40 and length of cut, preferably with a #600 grit wheel or the equivalent.
   a) Indicate the tool in holder.
   b) Finish the tool to the proper diameter and taper on the cutting end 6, preferably with a #600 grit wheel or the equivalent. The #600 grit wheel takes the rough marks out of the surface to produce a better finish on the surface when the tool is highly mirror polished.

5. Polish the entire cylindrical land length of the cutting end 6 to a high or mirror finish.
   a) Usually, the work area is cleaned to avoid contamination.
   b) Usually, the polish wheel is kept in bag to avoid contamination.
   c) The part is cleaned before it is put in holder for machining.
   d) The grinding wheel is charged with diamond compound.
   Approximately equal portions of #3000 grit and #8000 grit diamond polish compound are placed on the polish wheel.
   e) The cutting end 6 of the tool is polished by moving the tool back and forth on the polish wheel. The whole tool is not polished since polishing the shank 5 often creates slippage problems when securing the final tool in a holder. This polishing creates the "mirror" finish that exists on the final cutting edge lands 16A and 16B, next to the cutting edges 15A and 15B.

Figure 5:
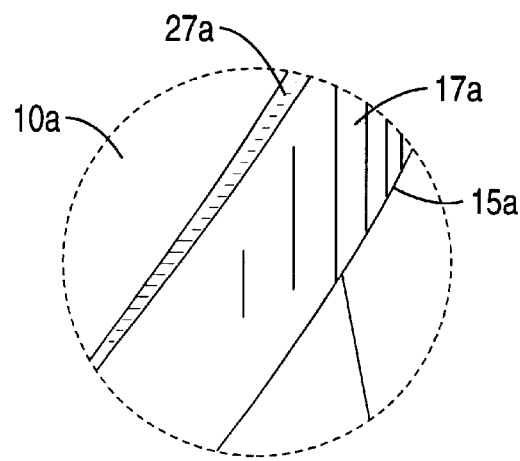
FIG. 5 an enlarged view of the portion of FIG. 4 denoted as "5" and shows an incomplete form of the subject invention in which only a cutting edge, an "initial" cutting land, and step to a flute exist, without the final primary and secondary lands.

6. Grind the flutes, primary and secondary lands, corner radius (please note that the tool may or may not have a corner radius, depending on the required design and use of the tool), and end with a suitable programmable grinding machine (a CNC Grinding Machine and equivalent types).
   a) Program the grinding machine for the flutes 10A and 10B, primary 18A and 18B and secondary angle 26A and 26B lands, corner radius 45, and end configuration 46.
   b) Set the tool to the appropriate length.
   c) Indicate the tool in the holder.
   d) Grind the tool.
      i) Digitize the end of tool.
      ii) Flute the tool (as indicated, two flutes are illustrated in the figures and examples, but one or additional flutes are contemplated in an equivalent form to those shown).
      iii) Each flute 10A and 10B is polished (for the tool at this point in the subject process, see FIGS. 4 and 5 in which the larger "initial" mirror edge lands 17A and 17B are seen (easily seen by the naked eye, as opposed to the "final" mirror lands 16A and 16B which are very narrow and difficult to see without the aid of magnification),).
      iv) The primary 18A and 18B and secondary 26A and 26B angle lands are ground. It is critical that when grinding the primary 18A and 18B and secondary 26A and 26B angle lands that the process does not remove the polished mirror edge lands 16A and 16B. The mirror edge lands 16A and 16B are created before the primary 18A and 18B and secondary angle 26A and 26B lands are ground, and are never removed or altered.

For example only, and not by way of limitation, Table 1 designates the "final" mirror edge land (16 A and 16 B) widths for a given diameter tool.

TABLE 1

| Typical Mirror Edge Land Widths | |
|---|---|
| Tool Diameter | Mirror Edge Land Width |
| .000"–.145" | .0005"/.0015" |
| .146"–.380" | .001"/.003" |
| .381"–.600" | .003"/.005" |
| .601"–1.00" | .004"/.006" |

7. Neck the tool to the appropriate length and neck diameter 35 with approximately an 8° feather blend (angles between 3° and 20° are usual, with 8° preferred).
   a) Put the tool in the holder and scale to appropriate length.
   b) Use a diamond grinding wheel GW with an 8° angle to "feather blend" the transition between the neck diameter 35 and cutting diameter 40. See FIG. 6 (before the grinding wheel GW actually grinds the tool 1 to produce the final feather blend region 30) in which the selected angle "α" exists in the shape of the grinding wheel GW to create the feather blend feature.
   c) The tool is necked to a final designated length (Note: FIG. 7 shows the final necked and feather blended tool 1.

The invention has now been explained with reference to specific embodiments. Other embodiments will be suggested to those of ordinary skill in the appropriate art upon review of the present specification.

Although the foregoing invention has been described in some detail by way of illustration and example for purposes of clarity of understanding, it will be obvious that certain changes and modifications may be practiced within the scope of the appended claims.

What is claimed is:

1. An improved single piece end mill having a neck with a neck diameter, a cutting end with a cutting end diameter, a flute formed within the cutting end, and a cutting edge formed along an outer border of the flute, wherein said improvement comprises a mirror polished cutting edge land extending from and along the cutting edge.

2. An improved single piece end mill having a neck with a neck diameter, a cutting end with a cutting end diameter, a flute formed within the cutting end, and a cutting edge formed along an outer border of the flute, wherein said improvement comprises:
   a) a mirror polished cutting edge land extending from and along the cutting edge;

b) a primary angle land continuing from said mirror polished cutting edge land and extending into the flute; and c) a secondary angle land adjoining said primary angle land and terminating within the flute.

3. An improved single piece end mill according to claim 2, further including a smoothed transition region between the culling end diameter and the neck diameter.

4. An improved single piece end mill having a neck with a neck diameter, a cutting end with a cutting end diameter, a flute formed within the cutting end, and a cutting edge formed along an outer border of the flute, wherein said improvement comprises:

a) a mirror polished cutting edge land extending from and along the cutting edge;

b) a primary angle land continuing from said mirror polished cutting edge land and extending into the flute;

c) a secondary angle land adjoining said primary angle land and terminating within the flute;

d) a smoothed transition region between the cutting end diameter and the neck diameter.

5. An improved single piece end mill having a neck with a neck diameter, a cutting end with a cutting end diameter, a plurality of flutes formed within the cutting end, and a flute associated with a cutting edge formed along an outer border of each of the flutes, wherein said improvement comprises:

a) a mirror polished cutting edge land extending from and along each of the cutting edges;

b) a primary angle land continuing from each of said mirror polished cutting edge lands and extending into the associated flute; and c) a secondary angle land adjoining each of said primary angle lands and terminating within the associated flute.

6. An improved single piece end mill according to claim 5, further comprising a smoothed transition region between the cutting end diameter and the neck diameter.

* * * * *